(12) United States Patent
Swallow et al.

(10) Patent No.: US 8,540,952 B2
(45) Date of Patent: Sep. 24, 2013

(54) CATALYZED SUBSTRATE AND EXHAUST SYSTEM FOR INTERNAL COMBUSTION ENGINE

(75) Inventors: Daniel Swallow, Sandy (GB); Andrew Francis Chiffey, Ware (GB); Paul Richard Phillips, Royston (GB)

(73) Assignee: Johnson Matthey Public Limited Company, London (GB)

( * ) Notice: Subject to any disclaimer, the term of this patent is extended or adjusted under 35 U.S.C. 154(b) by 0 days.

(21) Appl. No.: 13/525,461

(22) Filed: Jun. 18, 2012

(65) Prior Publication Data

US 2013/0149220 A1 Jun. 13, 2013

Related U.S. Application Data

(60) Provisional application No. 61/499,340, filed on Jun. 21, 2011.

(30) Foreign Application Priority Data

Jul. 13, 2011 (GB) .................................. 1111950.0

(51) Int. Cl.
*B01D 53/94* (2006.01)
*F01N 3/10* (2006.01)
*F01N 3/28* (2006.01)

(52) U.S. Cl.
USPC .................. 423/213.2; 423/213.5; 423/213.7; 60/299; 60/301

(58) Field of Classification Search
USPC .................. 423/213.2, 213.5, 213.7; 60/299, 60/301; 502/325, 326, 331, 337, 324, 74
See application file for complete search history.

(56) References Cited

U.S. PATENT DOCUMENTS

| 5,863,508 | A | 1/1999 | Lachman et al. | |
| 8,101,146 | B2 * | 1/2012 | Fedeyko et al. | 423/213.2 |
| 8,297,046 | B2 * | 10/2012 | Bandl-Konrad et al. | 60/297 |
| 2007/0277507 | A1 * | 12/2007 | Yan | 60/286 |
| 2010/0058746 | A1 | 3/2010 | Pfeifer et al. | |
| 2010/0221161 | A1 * | 9/2010 | Schneider et al. | 423/213.5 |
| 2011/0005200 | A1 | 1/2011 | Gandhi et al. | |
| 2011/0014099 | A1 | 1/2011 | Dornhaus et al. | |

FOREIGN PATENT DOCUMENTS

| EP | 0984142 A1 | 3/2000 |
| EP | 0560991 B2 | 9/2004 |
| EP | 2172268 A1 | 4/2010 |
| WO | 9947260 A1 | 9/1999 |
| WO | 2005016496 A1 | 2/2005 |
| WO | 2008036908 A2 | 3/2008 |
| WO | 2008075111 A1 | 6/2008 |
| WO | 2009138846 A1 | 11/2009 |
| WO | 2010114873 A2 | 10/2010 |
| WO | 2011023332 A1 | 3/2011 |

OTHER PUBLICATIONS

PCT International Search Report from corresponding PCT International Patent Application No. PCT/GB2012/051407, dated Sep. 28, 2012.
GB Search Report dated Nov. 9, 2011 for corresponding Application No. GB1111950.0 filed Jul. 13, 2011.

* cited by examiner

*Primary Examiner* — Timothy Vanoy
(74) *Attorney, Agent, or Firm* — Kevin M. Carroll

(57) ABSTRACT

An exhaust system, and a catalyzed substrate for use in an exhaust system, is disclosed. The exhaust system comprises a lean $NO_x$ trap and the catalyzed substrate. The catalyzed substrate has a first zone, having a platinum group metal loaded on a support, and a second zone, having copper or iron loaded on a zeolite. The first zone or second zone additionally comprises a base metal oxide or a base metal loaded on an inorganic oxide. Also provided are methods for treating an exhaust gas from an internal combustion engine using the exhaust system. The exhaust system is capable of storing $NH_3$ generated in rich purging, reacting the $NH_3$ with slip $NO_x$, controlling $H_2S$ released from $NO_x$ trap desulfation, and oxidizing slip hydrocarbons and carbon monoxide. When the catalyzed substrate is a filter substrate, it is also capable of removing soot from exhaust system.

6 Claims, No Drawings

CATALYZED SUBSTRATE AND EXHAUST SYSTEM FOR INTERNAL COMBUSTION ENGINE

This application claims priority to U.S. Provisional Application No. 61/499,340, filed on Jun. 21, 2011, and United Kingdom Application No. 1111950,0, filed Jul. 13, 2011. The entire teachings of the above applications are incorporated herein by reference.

FIELD OF THE INVENTION

The invention relates to an exhaust system and its use in treating exhaust gases from internal combustion engines, and in particular to a catalyzed substrate component useful in exhaust systems.

BACKGROUND OF THE INVENTION

Internal combustion engines produce exhaust gases containing a variety of pollutants, including hydrocarbons, carbon monoxide, nitrogen oxides, sulfur oxides, and particulate matter. Increasingly stringent national and regional legislation has lowered the amount of pollutants that can be emitted from such diesel or gasoline engines. Many different techniques have been applied to exhaust systems to clean the exhaust gas before it passes to atmosphere.

A typical exhaust system comprises (1) a $NO_x$ adsorber catalyst (or "$NO_x$ trap") to adsorb $NO_x$ from the exhaust gas, (2) an oxidation catalyst to oxidize hydrocarbons that were not combusted in the internal combustion engine and to convert CO to $CO_2$, and (3) a carbon soot filter to remove particulates from the exhaust gas before release to atmosphere. Various combinations of these systems have been disclosed.

U.S. Appl. Pub. No. 2011/0005200 teaches a catalyst system that simultaneously removes ammonia and enhances net $NO_x$ conversion by placing an ammonia-selective catalytic reduction ("$NH_3$-SCR") catalyst formulation downstream of a lean $NO_x$ trap. The $NH_3$-SCR catalyst is taught to adsorb the ammonia that is generated during the rich pulses in the lean $NO_x$ trap. The stored ammonia then reacts with the $NO_x$ emitted from the upstream lean $NO_x$ trap, which increases $NO_x$ conversion rate while depleting the stored ammonia.

U.S. Appl. Pub. No. 2011/0014099 teaches a catalytically active particulate filter useful for removing nitrogen oxides and particulates from exhaust gases of internal combustion engines operated predominantly under lean conditions. The particulate filter comprises a filter body, a platinum group metal oxidation catalyst active coating, and a copper compound located in a second coating.

PCT Intl. Appl. WO 2008/075111 teaches an exhaust system including (1) a $NO_x$ adsorber catalyst ("NAC"), (2) a catalyzed soot filter, (3) means for enriching the exhaust gas intermittently during normal lean running operation in order to remove sulfate (as $H_2S$) adsorbed on the NAC, and (4) a compound located downstream of at least some of the NAC, which is effective to remove and/or convert at least some of the generated $H_2S$ in the enriched exhaust gas. The $H_2S$ removal compound may be located at various positions in the exhaust system, including (a) between the NAC and the catalyzed soot filter, (b) on a substrate downstream of the NAC, (c) on the catalyzed soot filter, (d) between the catalyzed soot filter and the exhaust system exit, and (e) various combinations of (a)-(d).

PCT Intl. Appl. WO 2010/114873 discloses emissions treatment systems that contain ammonia-generating catalysts such as $NO_x$ storage reduction or lean $NO_x$ trap ("LNT") catalysts in combination with selective catalytic reduction ("SCR") catalysts, and methods for their use with lean burn engines. The LNT and SCR catalysts can be used in a variety of configurations. For instance the LNT and SCR catalysts can be located (1) each on a separate substrate brick, (2) in a front zone and a rear zone of a single substrate brick, or (3) on a diesel particulate filter that is downstream of the SCR, such that each component can be on its own substrate or the SCR can be coated on a front zone of the diesel particulate filter or along the entire length of the diesel particulate filter.

PCT Intl. Appl. WO 2011/023332 discloses an exhaust-gas aftertreatment system having a wall-flow filter as component (1) and, downstream thereof, a flow-through monolith as component (2). Components (1) and (2) have at least one storage function for the same compound, selected from the group comprising $SO_x$, $NO_x$, $NH_3$, $O_2$, hydrocarbons, and $H_2S$, characterized in that the storage capacity in the component (2) is to be designed such that the breakthrough signal downstream of component (2) has the highest gradient of the concentration curve resulting at the respective termination criterion taken into consideration for the exhaust-gas compound while as little as possible of the storage material is used.

As with any automotive system and process, it is desirable to attain still further improvements in exhaust gas treatment systems. We have discovered a new exhaust system and catalyzed substrate that provide enhanced cleaning of the exhaust gases from internal combustion engines.

SUMMARY OF THE INVENTION

The invention is an exhaust system for internal combustion engines. The exhaust system comprises a lean $NO_x$ trap and a catalyzed substrate. The catalyzed substrate has a first zone and a second zone, wherein the first zone comprises a platinum group metal loaded on a support and the second zone comprises copper or iron loaded on a zeolite. The first zone or the second zone additionally comprises a base metal oxide or a base metal loaded on an inorganic oxide. The invention also includes the catalyzed substrate itself. The catalyzed substrate is a multi-functional component that stores $NH_3$ generated in a lean $NO_x$ trap during rich conditions (purging), uses the stored $NH_3$ to react with any $NO_x$ that slips past the $NO_x$ trap, controls $H_2S$ released from $NO_x$ trap desulfation, and oxidizes slip hydrocarbons and carbon monoxide. When placed on a filter substrate, the catalyzed substrate will perform a sixth function of removing soot from exhaust gas.

DETAILED DESCRIPTION OF THE INVENTION

The exhaust system of the invention comprises a lean $NO_x$ trap and a catalyzed substrate. Lean $NO_x$ traps are well known in the art (see for example European Patent Pub. No. 0560991). Lean $NO_x$ traps are devices that adsorb $NO_x$ under lean exhaust conditions, release the adsorbed $NO_x$ under rich conditions, and reduce the released $NO_x$ to form $N_2$.

A lean $NO_x$ trap typically includes a $NO_x$ adsorbent for the storage of $NO_x$ and an oxidation/reduction catalyst. The oxidation/reduction catalyst generally comprises one or more noble metals, preferably platinum, palladium, and/or rhodium. Typically, platinum is included to perform the oxidation function and rhodium is included to perform the reduction function.

The $NO_x$-storage component preferably comprises alkaline earth metals (such as barium, calcium, strontium, and magnesium), alkali metals (such as potassium, sodium, lithium, and cesium), rare earth metals (such as lanthanum, yttrium, praseodymium and neodymium), or combinations thereof. These metals are typically found in the form of oxides.

The oxidation/reduction catalyst and the $NO_x$-storage component are preferably loaded on a support material such as an inorganic oxide for use in the exhaust system. Inorganic oxides such as alumina, ceria, titania, zirconia, and combinations thereof are preferably utilized as the support material.

The lean $NO_x$ trap performs three functions. First, nitric oxide reacts with oxygen to produce $NO_2$ in the presence of the oxidation catalyst. Second, the $NO_2$ is adsorbed by the $NO_x$ adsorbent in the form of an inorganic nitrate (for example, BaO or $BaCO_3$ is converted to $Ba(NO_3)_2$ on the $NO_x$ adsorbent). Lastly, when the engine runs under rich conditions, the stored inorganic nitrates decompose to form NO or $NO_2$ which are then reduced to form $N_2$ by reaction with carbon monoxide, hydrogen and/or hydrocarbons in the presence of the reduction catalyst. Typically, the nitrogen oxides are converted to nitrogen, carbon dioxide and water in the presence of heat, carbon monoxide and hydrocarbons in the exhaust stream.

In a $NO_x$ trap, the $NO_x$ adsorbent and the oxidation/reduction catalyst are preferably coated on a flow-through substrate, preferably a honeycomb monolith. The flow-through substrate may be made of a ceramic material (e.g., cordierite) or a metallic material. The lean $NO_x$ trap is typically designed to provide a number of channels through which vehicle exhaust passes. The surface of the channels is loaded with the $NO_x$ adsorbent and the oxidation/reduction catalyst(s).

The components of the $NO_x$ trap may be added by any known means. For example, the support material, oxidation-reduction catalyst and the $NO_x$ adsorbent material may preferably applied and bonded to the substrate as a washcoat, a porous, high surface area layer bonded to the surface of the substrate. The washcoat is typically applied to the substrate from a water-based slurry, then dried and calcined at high temperature. The washcoat may alternatively comprise the support and $NO_x$ adsorber, and the oxidation-reduction catalyst may be loaded onto the dried washcoat support layer (by impregnation, ion-exchange, or the like), then dried and calcined.

Although the lean $NO_x$ trap is very efficient at converting $NO_x$ from an internal combustion engine to $N_2$, some exhaust gas $NO_x$ will slip through the lean $NO_x$ trap as the $NO_x$ adsorber becomes saturated. In addition, there are some byproducts that are produced in the lean $NO_x$ trap. For example, non-selective reduction pathways may result in the production of ammonia ($NH_3$) and nitrous oxide ($N_2O$) rather than the desired $N_2$. These undesired emissions are typically sought to be avoided or reduced.

Secondary reactions also include the production of hydrogen sulfide. The presence of sulfur compounds in the diesel or gasoline fuel leads to sulfur oxides in the exhaust gas. In the lean $NO_x$ trap, sulfur dioxide is oxidized to sulfur trioxide over the oxidation catalyst and the $NO_x$ adsorber reacts with the sulfur trioxide to produce surface sulfates (e.g., barium oxide or barium carbonate reacts with sulfur trioxide to form barium sulfate). These sulfates are more stable than the nitrates and require higher temperatures to desulfate resulting in sulfur deactivation of the lean $NO_x$ trap. Desulfation can be accomplished by a variety of techniques including by a series of short, rich pulses ("rich pulsing"). During desulfation, hydrogen sulfide and $SO_2$ are produced. Because of hydrogen sulfide's unpleasant rotten egg odor and its toxicity at higher concentrations, its production is undesired. Thus, any exhaust system that minimizes the amount of $H_2S$, as well as $NH_3$ and $N_2O$, is advantageous.

In addition to the lean $NO_x$ trap, the exhaust system of the invention also comprises a catalyzed substrate having a first zone and a second zone. The invention also includes the catalyzed substrate itself.

The catalyzed substrate is a substrate that contains catalyst components. The substrate is preferably a ceramic substrate or a metallic substrate. The ceramic substrate may be made of any suitable refractory material, e.g., alumina, silica, titania, ceria, zirconia, magnesia, zeolites, silicon nitride, silicon carbide, zirconium silicates, magnesium silicates, aluminosilicates and metallo aluminosilicates (such as cordierite and spodumene), or a mixture or mixed oxide of any two or more thereof. Cordierite, a magnesium aluminosilicate, and silicon carbide are particularly preferred.

The metallic substrate may be made of any suitable metal, and in particular heat-resistant metals and metal alloys such as titanium and stainless steel as well as ferritic alloys containing iron, nickel, chromium, and/or aluminum in addition to other trace metals.

The substrate is preferably a filter substrate or a flow-through substrate. In particular, the flow-through substrate is a flow-through monolith preferably having a honeycomb structure with many small, parallel thin-walled channels running axially through the substrate and extending throughout the substrate. The channel cross-section of the substrate may be any shape, but is preferably square, sinusoidal, triangular, rectangular, hexagonal, trapezoidal, circular, or oval. The substrate is most preferably a flow-through monolith substrate or a filter substrate. If the substrate is a filter substrate, it is preferably a wall-flow monolith filter. The channels of a wall-flow filter are alternately blocked, which allow the exhaust gas stream to enter a channel from the inlet, then flow through the channel walls, and exit the filter from a different channel leading to the outlet. Particulates in the exhaust gas stream are thus trapped in the filter.

The substrate contains two catalytic zones, each zone containing a different catalyst composition deposited on the substrate. Preferably, there is little or no overlap of the two zones on the substrate. For instance, the first zone may cover from 10 to 90 percent of the total length of the substrate and the second zone would cover the rest of the length of the substrate (i.e., the remaining 90 to 10 percent uncovered by the first zone). More preferably, the first zone covers from 40 to 60 percent of the total length of the substrate and the second zone covers the rest of length of the substrate (i.e., the remaining 60 to 40 percent uncovered by the first zone). When a wall-flow monolith filter is utilized, one zone may be deposited in the inlet channels and the other zone may be deposited in the outlet channels, thus effectively separating the first and second zones. Methods of zone coating are disclosed in, for example, PCT Intl. Appl. WO 99/47260.

The first zone comprises a platinum group metal loaded on a support. The platinum group metal is preferably platinum, palladium, rhodium, or mixtures thereof; most preferably, the platinum group metal is platinum, palladium, and mixtures thereof. The support is preferably a zeolite, an inorganic oxide, or mixtures thereof. More preferably, the support is an inorganic oxide such as alumina, silica, titania, zirconia, ceria, niobia, tantalum oxides, molybdenum oxides, tungsten oxides, mixed oxides or composite oxides of any two or more thereof (e.g. silica-alumina, ceria-zirconia or alumina-ceria-zirconia), and mixtures thereof. A ceria-zirconia mixed oxide is particularly preferred.

The second zone comprises copper or iron loaded on a zeolite, including mixtures of copper and iron. The zeolite may be any natural or synthetic zeolite, including molecular sieves, and is preferably composed of aluminum, silicon, and/or phosphorus. The zeolites typically have a three-dimensional arrangement of $SiO_4$, $AlO_4$, and/or $PO_4$ that are joined by the sharing of oxygen atoms. The zeolite frameworks are typically anionic, which are counterbalanced by charge compensating cations, typically alkali and alkaline earth elements (e.g., Na, K, Mg, Ca, Sr, and Ba) and also protons. Other metals (e.g., Fe, Ti, and Ga) may be incorporated into the framework of the zeolite to produce a metal-incorporated zeolite (e.g., a titanosilicalite). The second zone may preferably contain one or more platinum group metals, preferably platinum, palladium, or rhodium, but if utilized, the total loading of the platinum group metal in the second zone will be low, at less than 1 $g/ft^3$ (0.035 g/L).

The zeolite is preferably a beta zeolite, a faujasite (such as an X-zeolite or a Y-zeolite, including NaY and USY), an L-zeolite, a ZSM zeolite (e.g., ZSM-5, ZSM-48), an SSZ-zeolite (e.g., SSZ-13, SSZ-41, SSZ-33), a ferrierite, a mordenite, a chabazite, an offretite, an erionite, a clinoptilolite, a silicalite, an aluminum phosphate zeolite (including metalloaluminophosphates such as SAPO-34), a mesoporous zeolite (e.g., MCM-41, MCM-49, SBA-15), or mixtures thereof; more preferably, the zeolite is a beta zeolite, a ferrierite, or a chabazite.

The first zone or the second zone additionally comprises a base metal oxide or a base metal loaded on an inorganic oxide. The base metal is preferably iron, manganese, copper, nickel, or mixtures thereof. The inorganic oxide is preferably alumina, silica, titania, zirconia, ceria, niobia, tantalum oxides, molybdenum oxides, tungsten oxides, any mixed oxide or composite oxide thereof, and mixtures thereof. Alumina is particularly preferred. The base metal oxide is preferably iron oxide, manganese oxide, copper oxide, nickel oxide, or mixtures thereof, thus particles of base metal oxide, such as iron oxide, alone can be added to the first or second zone.

Preferably, the base metal is located on the second zone such that the second zone comprises copper or iron loaded on a zeolite and a base metal oxide or base metal loaded on an inorganic oxide. When the base metal is located in the first zone, it is most preferred that the base metal is physically separated from the platinum group metal. Thus, separate particles of the supported platinum group metal and the base metal oxide or base metal loaded on an inorganic oxide are added to the first zone in order to physically separate the two catalysts within the first zone.

The catalyzed substrate of the present invention may be prepared by processes well known in the prior art. Preferably, the catalytic zones are deposited on the substrate using washcoat procedures. A representative process for preparing the catalyzed substrate using a washcoat procedure is set forth below. It will be understood that the process below can be varied according to different embodiments of the invention. Also, the order of addition of the first zone and the second zone onto the substrate is not considered critical. Thus, the first zone can be washcoated on the substrate prior to washcoating the second zone or the second zone can be washcoated on the substrate prior to washcoating the first zone.

The first zone of the catalyzed substrate is preferably prepared using a washcoat procedure. The platinum group metal may be added to the support prior to the washcoating step or may be added to a support-coated substrate after washcoating the support onto the substrate. If the platinum group metal is added to the support prior to washcoating the first zone of the substrate, it can be loaded onto the support by any known means, the manner of addition is not considered to be particularly critical. For example, a platinum compound (such as platinum nitrate) may be supported on the support by impregnation, adsorption, ion-exchange, incipient wetness, precipitation, or the like.

The washcoating is preferably performed by first slurrying finely divided particles of the supported platinum group metal (or just the support) in an appropriate solvent, preferably water, to form the slurry. The slurry preferably contains between 5 to 70 weight percent solids, more preferably between 10 to 50 weight percent. Preferably, the support or the platinum group metal/support particles are milled or subject to another comminution process in order to ensure that substantially all of the solid particles have a particle size of less than 20 microns in an average diameter, prior to forming the slurry. Additional components, such as stabilizers or promoters may also be incorporated in the slurry as a mixture of water soluble or water-dispersible compounds or complexes.

The substrate may then be coated one or more times with the slurry such that there will be deposited on the substrate the desired loading of catalytic materials. If only the support is deposited on the substrate, the platinum group metal may then be added to the support-coated substrate by any known means, including impregnation, adsorption, or ion-exchange of a platinum compound (such as platinum nitrate). Preferably, the substrate is coated with the slurry so that the first zone only occupies from 10 to 90 percent of the axial length of the substrate, more preferably from 40 to 60 percent of the axial length the substrate.

After the first zone of the substrate has been coated with the slurry, and impregnated with platinum group metal if necessary, the coated substrate is typically dried by heating at an elevated temperature of preferably 80 to 150° C. The substrate may also be calcined at higher temperatures (such as 400 to 600° C.) but calcination is typically not required before the addition of the second zone.

If the base metal is added to the first zone, the supported platinum group metal and the base metal oxide (or base metal/inorganic oxide) are preferably loaded onto the substrate such that the two catalysts are physically separated within the first zone. This may be accomplished by any known means, but preferably the base metal oxide (or base metal/inorganic oxide) is added to the first zone as a separate washcoat step from the addition of the platinum group metal. If a base metal/inorganic oxide is utilized, the base metal is preferably loaded onto the inorganic oxide (by, for example, supporting a base metal compound such as iron acetate on the inorganic oxide by impregnation, adsorption, ion-exchange, incipient wetness, precipitation, or the like) prior to washcoating the first zone. Alternatively, the platinum group metal and the base metal may be added simultaneously by washcoating a slurry that contains distinct particles of the base metal oxide (or base metal/inorganic oxide) and the supported platinum group metal.

If the base metal is added to the first zone, the substrate is dried by heating at an elevated temperature of preferably 80 to 150° C. The substrate may also be calcined at higher temperatures (such as 400 to 600° C.) but calcination is typically not required.

The second zone of the catalyzed substrate is preferably prepared using a washcoat procedure. The copper or iron is preferably loaded onto the zeolite by any known means to form a Cu(Fe)/zeolite species prior to washcoating the second zone of the substrate, the manner of addition is not considered to be particularly critical. For example, a copper compound (such as copper acetate) or an iron compound (such as iron acetate) may be supported on the zeolite by impregnation, adsorption, ion-exchange, incipient wetness, precipitation, or the like. Other metals may also be added to the Cu(Fe)/zeolite combination.

The base metal oxide (or base metal/inorganic oxide) is preferably added to the second zone. Preferably, finely divided particles of the Cu(Fe)/zeolite and base metal oxide (or base metal/inorganic oxide) are slurried in an appropriate solvent, preferably water. Preferably, the particles of the Cu(Fe)/zeolite and base metal oxide (or base metal/inorganic oxide) are milled or subject to another comminution process in order to ensure that substantially all of the solid particles have a particle size of less than 20 microns in an average diameter, prior to forming the slurry. Additional components, such as stabilizers or promoters may also be incorporated in the slurry as a mixture of water soluble or water-dispersible compounds or complexes.

The substrate (at the opposite end of the substrate from where the first zone was deposited) may then be coated one or more times with the slurry of Cu(Fe)/zeolite and base metal such that there will be deposited on the substrate the desired loading of catalytic materials. Alternatively, the Cu(Fe)/zeolite and the base metal species may be added as separate layers on the substrate. For instance, a base layer of the slurry containing just the copper Cu(Fe)/zeolite may be first deposited on the substrate, followed by a top layer of the base metal species, or the reverse layering scheme.

Preferably, the substrate is coated with the second zone slurry so that the second zone and the first zone have little or no overlap. The second zone will preferably only occupy from 10 to 90 percent of the axial length of the substrate, more preferably from 40 to 60 percent of the axial length of the substrate.

After the substrate has been coated with the second slurry, the coated substrate is typically dried and then calcined by heating at an elevated temperature. Preferably, the calcination occurs at 400 to 600° C. for approximately 1 to 8 hours.

In certain instances, it may be preferable to add a small third zone to the substrate such that the third zone (preferably occupying less than 20 percent, and more preferably less than 10 percent, of the axial length of the substrate) is located after the second zone and at the opposite end of the substrate from the third zone. A third zone may be particularly useful when the substrate is a filter substrate and the first zone is positioned in the exhaust system to contact the exhaust gas prior to the second zone, such that hydrocarbons and CO formed during burning of soot at high temperature may not be totally combusted over the second zone. If used, the third zone will contain platinum group metals, preferably platinum, palladium, and/or rhodium, to aid in the oxidation of any hydrocarbons and CO.

The catalyzed substrate is preferably located in the exhaust system such that it is downstream of the lean $NO_x$ trap, so that the exhaust gas contacts the lean $NO_x$ trap prior to contacting the catalyzed substrate. Preferably, the two-zone catalyzed substrate is positioned in the exhaust system such that there is an upstream (entrance) zone which is contacted by the exhaust gas after exiting the lean $NO_x$ trap and a downstream (exit) zone following the upstream zone. The upstream zone that contacts the exhaust gas from the lean $NO_x$ trap may be either the first zone or the second zone of the catalyzed substrate. Thus, the first zone can be oriented to receive exhaust gas from the $NO_x$ trap prior to the second zone; or the second zone can be oriented to receive exhaust gas from the $NO_x$ trap prior to the second zone. Preferably, the first zone of the catalyzed substrate is oriented to receive exhaust gas from the $NO_x$ trap prior to the second zone, such that the exhaust gas from the lean $NO_x$ trap contacts the platinum group metal catalyst prior to contacting the copper or iron loaded on the zeolite.

The two-zone catalyzed substrate performs five different functions in the exhaust system. First, $NH_3$ that is generated in the lean $NO_x$ trap during rich conditions (purging) is stored by the copper zeolite component. Second, the stored $NH_3$ will react with any slip $NO_x$ that passes through the $NO_x$ trap. Thus, not only is the amount of ammonia discharged to the atmosphere mitigated, the $NO_x$ conversion of the exhaust system is also optimized by the exhaust system of the invention. Third, the catalyzed substrate controls the $H_2S$ released from $NO_x$ trap desulfation by oxidizing to $SO_2$. Fourth, the platinum group metal catalyst oxidizes hydrocarbons ("slip hydrocarbon") that are not converted prior to contacting the catalyzed substrate. Fifth, the platinum group metal catalyst oxidizes slip carbon monoxide not converted prior to the catalyzed substrate.

Preferably, the catalyzed substrate is a filter substrate. When it is a filter substrate, the catalyzed substrate performs a sixth function of removing soot from the exhaust gas.

If the catalyzed substrate is a flow-through substrate, the exhaust system of the invention preferably includes a particulate filter, more preferably a catalyzed soot filter. Where present, the particulate filter is preferably capable of collecting soot without causing excessive back-pressure in the exhaust system. In general, ceramic, sintered metal or woven or non-woven wire filters are usable, and wall-flow honeycomb structures are particularly preferred. The structural material of the filter is preferably a porous ceramic, silicon carbide, or sintered metal. The filter can be catalyzed, e.g. it may include an alumina coating and/or a base metal catalyst such as $La/Cs/V_2O_5$. The soot is generally carbon containing soluble organic fractions and/or volatile organic fractions and/or heavy hydrocarbons. Combustion of soot produces $CO_2$ and $H_2O$.

If utilized, the particulate filter may be located upstream or downstream of the catalyzed substrate. Preferably, the particulate filter is upstream of the catalyzed substrate and downstream of the lean $NO_x$ trap such that the exhaust gas from the internal combustion engine passes through the lean $NO_x$ trap, then the particulate filter, followed by the catalyzed substrate before passing to atmosphere.

The invention also encompasses treating an exhaust gas from an internal combustion engine, in particular for treating exhaust gas from a vehicular lean burn internal combustion engine, such as a diesel engine, a lean-burn gasoline engine, or an engine powered by liquid petroleum gas or natural gas. The method comprises flowing the exhaust gas through a lean $NO_x$ trap and the catalyzed substrate.

The following examples merely illustrate the invention. Those skilled in the art will recognize many variations that are within the spirit of the invention and scope of the claims.

EXAMPLE 1

Preparation of Catalyzed Substrates

Catalyzed Substrate having Zone 1 and Zone 2 is prepared as follows:

Zone 1 (Pt—Pd on $CO_2$—$ZrO_2$+$Al_2O_3$+zeolite): An aqueous slurry of alumina (particle size d90 of less than 10 micron) is combined with an aqueous solution of platinum salt and palladium nitrate. A ceria-zirconia mixed oxide (particle size d90<10 micron) is then added to the slurry, followed by beta zeolite to give a final composition of alumina:mixed oxide:zeolite of 4:3:3. This slurry is washcoated onto the inlet channels of a 3.0 L volume aluminum titanate wall flow filter (300 cells per square inch (46.5 cells cm$^{-2}$)), and dried in air at 100° C. The final total coating loading in Zone 1 was 0.55 g/in$^3$ (33.6 g/L), with a platinum group metal loading of 45 g/ft$^3$ (1.59 g/L; Pt:Pd mass ratio=2:1).

Zone 2 (Cu/zeolite and iron oxide): An aqueous slurry of alumina (particle size d90<10 micron) is combined with a slurry of Cu exchanged zeolite and iron oxide particles (FeOOH, d90<10 micron) to give a final composition of alumina:zeolite:iron oxide of 4:3:3. This slurry is coated onto the outlet channels of the wall flow filter, dried in air at 100° C. and then calcined at 500° C. The final coating loading in Zone 2 was 0.5 g/in$^3$ (30.5 g/L), with a copper loading of 12 g/ft$^3$ (0.42 g/L) and an iron loading of 250 g/ft$^3$ (8.83 g/L).

EXAMPLE 2

Testing Procedures

An engine-aged lean $NO_x$ trap (LNT) and the Catalyzed Substrate of Example 1 are mounted in a stainless steel can using standard procedures and in a close-coupled position, and fitted to the exhaust gas system of a bench-mounted 2.0 liter common rail diesel engine. The engine-aged LNT is thermally oven aged at 800° C. in air prior to mounting in the test apparatus and the Catalyzed Substrate is hydrothermally oven aged (in presence of water) at 800° C. in air prior to use. The Catalyzed Substrate is placed in the system downstream of the LNT and is oriented such that the exhaust gas from the LNT first contacts Zone 1 prior to contacting Zone 2 (listed in following tables as Substrate 1A). The engine is coupled to a dynamometer in the conventional manner, with both engine and dynamometer being controlled by computer. Exhaust emissions upstream of the LNT, following the LNT, and following the Catalyzed Substrate are measured at 1 second intervals.

$NO_x$, CO, and Hydrocarbon Conversion and Peak $NH_3$ Measurements: The engine is operated over three MVEG-B drive cycles and the peak $NH_3$ and the conversion of $NO_x$, CO, and hydrocarbon (HC—non-methane hydrocarbons) emissions are determined over the entire third MVEG cycle in order to test under stabilized conditions. The results are shown in Table 1 (peak $NH_3$) and Table 2 ($NO_x$, CO, and HC conversions).

Peak $H_2S$ Testing: The engine is run at 2000 rpm and 70 Nm torque under steady state lean-only conditions, using diesel fuel containing 350 ppm S, to result in a $NO_x$ trap inlet temperature of 300° C. The lean-only conditions produce sulfate on the $NO_x$ trap with a target sulfur loading of 1 g S in the trap. Under lean-only conditions, the $NO_x$ trap inlet temperature is increased to 550° C. and then desulfation is then performed at 2000 rpm and 70 Nm, using lean/rich fast switching (wobble) for 10 minutes resulting in a bed temperature of 700-750° C. $H_2S$ is measured after the LNT and after the Catalyzed Substrate.

The above test conditions are repeated on a combined system wherein the Catalyzed Substrate is placed in the system such that the exhaust gas from the LNT first contacts Zone 2 prior to contacting Zone 2 (listed in following tables as Substrate 1 B).

The results (see Table 1) show that the Catalyzed Substrate (both 1A and 1 B) significantly reduces the amount of $NH_3$ in the exhaust gas stream and also significantly reduces the amount of $H_2S$ measured from desulfation, in particular for Substrate 1A having Zone 1 contacted first. The results also show that $NO_x$, HC, and CO conversions are also increased when a Catalyzed Substrate (both 1A and 1B) is placed after the LNT. The results for instance show that both Substrate 1A and 1B further increase HC conversion by an additional 11% after the LNT, thus effectively increasing overall HC conversion to 70% from the 59% converted over the LNT.

TABLE 1

Ammonia and Hydrogen Sulfide Results

| Exhaust gas following: | Total $NH_3$ measured (ppm) | Total $H_2S$ measured from desulfation (ppm) |
|---|---|---|
| LNT | 200 | 250 |
| Substrate 1A (Zone 1-Zone 2) | <2 | 1 |
| Substrate 1B (Zone 2-Zone 1) | <2 | 50 |

TABLE 2

$NO_x$, Hydrocarbon, and CO Conversion over MVEG cycle

| Exhaust gas following: | $NO_x$ Conversion (%) | HC Conversion (%) | CO Conversion (%) |
|---|---|---|---|
| LNT | 22 | 59 | 69 |
| Substrate 1A (Zone 1-Zone 2) | +3-6 | +11 | +9 |
| Substrate 1B (Zone 2-Zone 1) | +3-6 | +11 | +7 |

We claim:

1. An exhaust system for internal combustion engines comprising:
   (a) a lean $NO_x$ trap; and
   (b) a catalyzed filter substrate having a first zone and a second zone, wherein the first zone comprises a platinum group metal loaded on a support and the second zone comprises copper or iron loaded on a zeolite, and the first zone or the second zone additionally comprises a base metal oxide or a base metal loaded on an inorganic oxide.

2. The exhaust system of claim 1 wherein the zeolite is selected from the group consisting of a beta zeolite, a faujasite, an L-zeolite, a ZSM zeolite, an SSZ-zeolite, a ferrierite, a mordenite, a chabazite, an offretite, an erionite, a clinoptilolite, a silicalite, an aluminum phosphate zeolite, a mesoporous zeolite, and mixtures thereof.

3. The exhaust system of claim 1 wherein the platinum group metal is selected from the group consisting of palladium, platinum, rhodium, and mixtures thereof, and the support is selected from the group consisting of inorganic oxides, zeolites, and mixtures thereof.

4. The exhaust system of claim 1 wherein the base metal is selected from the group consisting of iron, manganese, copper, nickel, and mixtures thereof, and the base metal oxide is selected from the group consisting of iron oxide, manganese oxide, copper oxide, nickel oxide, and mixtures thereof.

5. The exhaust system of claim 1 wherein the second zone comprises copper or iron loaded on a zeolite and a base metal oxide or a base metal loaded on an inorganic oxide.

6. The exhaust system of claim 1 wherein the catalyzed filter substrate is oriented such that the first zone is contacted by an exhaust gas from the $NO_x$ trap prior to the second zone.

* * * * *